D. C. G. HUGHES.
ELECTRICALLY HEATED UTENSIL.
APPLICATION FILED JULY 8, 1915.
1,191,426.
Patented July 18, 1916.
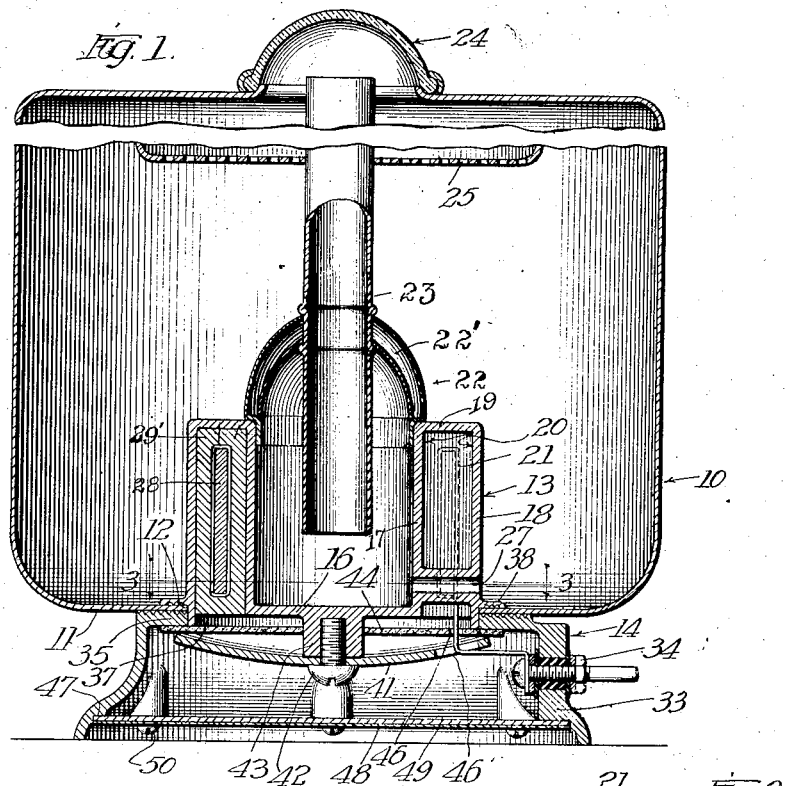
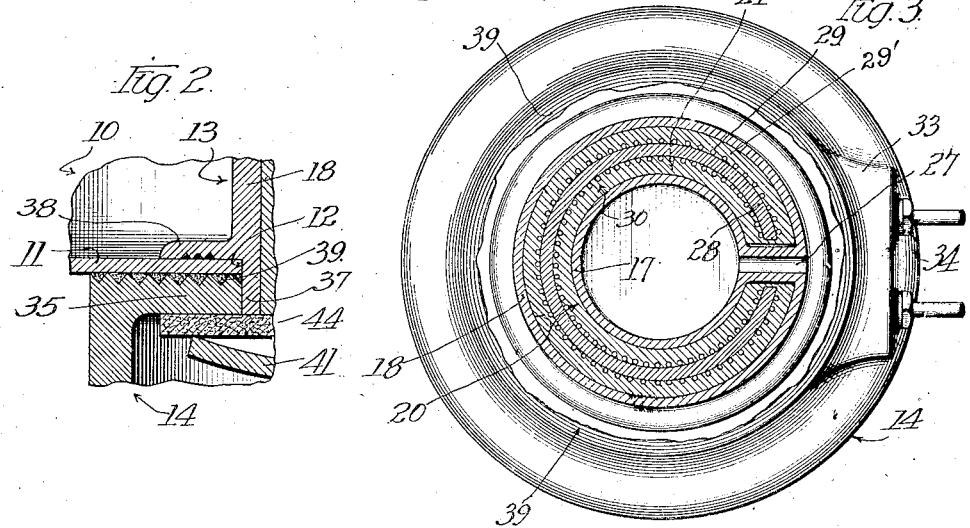
Witnesses:
Robert H. Weir
Stanley W. Cook
Inventor
Davydd C. G. Hughes

UNITED STATES PATENT OFFICE.

DAVYDD C. G. HUGHES, OF CHICAGO, ILLINOIS.

ELECTRICALLY-HEATED UTENSIL.

1,191,426.

Specification of Letters Patent.  Patented July 18, 1916.

Application filed July 8, 1915. Serial No. 38,660.

*To all whom it may concern:*

Be it known that I, DAVYDD C. G. HUGHES, a citizen of the United States, residing at Chicago, in the county of Cook and State of Illinois, have invented certain new and useful Improvements in Electrically-Heated Utensils, of which the following is a specification.

My invention relates to electrically heated utensils, and in some of its features more particularly to the construction of cooking utensils in which water is circulated, as in a coffee percolator.

One of the objects of my invention is to provide a combined base and electrical heating element for assemblage with the body of a utensil that has a bottom opening, and for advantageous coöperation with a percolator structure.

A further object of my invention is to provide an improved vaporizing chamber and eduction means.

Other objects of my invention are to attain simplicity of construction, low expense in manufacture, ease of assemblage, ruggedness and durability to withstand hard use, and efficiency in operation.

In the drawings wherein I have illustrated an embodiment of my invention in a coffee percolator, Figure 1 is a central vertical section; Fig. 2 is an enlarged sectional detail and Fig. 3 is a horizontal section on line 3—3 of Fig. 1.

In the particular construction shown in the drawings the vessel 10, of any desired design, has in its bottom 11 an opening 12, and with it are associated a heating-cup structure 13 and the base structure 14. The hollow-walled cup 13 that encircles the vaporizing chamber is preferably an aluminum casting. In the preferred form shown, it has a central upwardly-opening well 15 with a closed bottom 16 and concentric double walls 17 and 18 connected by the annular top wall 19 to form a downwardly opening annular chamber 20 to receive the electrical heating element 21. When the structure is used in a coffee percolator, a hood 22 preferably makes substantially tight contact with the edges of the top wall 19, and opens centrally to a percolator tube 23, the top of which is shown as opening to a dome 24 above the level of the coffee containing basket 25. In the specific arrangement shown, and that I find to be very advantageous, the hood 22 is made double-walled, with an air space 22' between its walls; the lower edge of the hood preferably telescoping into the mouth of well 15; and the eduction tube 23 is led down into the well, preferably to a point in the lower portion of said well. Ingress of water from the receptacle 10 into the well 15 is provided for by arrangement of one or more tubes 27 (that may be integrally cast in the structure 13 as a matter of economical construction) bridging the chamber 20 and opening through the inner and outer walls 17 and 18 thereof below the end of tube 23.

The heating element 21 may be of any suitable construction including an insulated coil of resistance wire secured in the annular chamber 20, in fashion effectively to heat the wall of the well. The preferred construction shown comprises a band of asbestos or other suitable insulating material, shown at 28, spirally wound with the resistance wire 29 and embedded in a body of insulating material 29' which is self retaining in chamber 20. In constructing such preferred heating element the wire-carrying ring may be located in spaced relation to the walls of the chamber 20 and the clearance space then filled with insulating material in a plastic condition, capable of hardening for self retention. Where, as illustrated, a single tube 27 for water ingress to chamber 15 is provided, the band 28 may have its ends positioned on opposite sides of the tube, the interspace being filled with the insulating material.

For advantageous construction the heating cup structure 13 and base structure 14 coact, mutually, to engage the apertured receptacle. The base structure 14 shown is of hollow, annular construction of suitable depth for necessary heat insulation, is sealed throughout when in finished condition, and is preferably provided at a suitable point on its side wall with a boss 33 carrying binding post 34 to which the terminals of wire 29 are connected. Thus, in detail, the base has an annular top wall 35, preferably having a circularly serrated surface for contact with the underside of the vessel bottom 11, and the annular opening encompassed by said serrated surface is of the same size as opening 12 in the vessel bottom. The heating cup structure, that preferably has its bottom 16 about on the line of the vessel bottom 11, has its outer wall 12 extended downward in a lip 37, of suitable depth to engage the edge wall 35, and it has a flange 38, that may also be annularly serrated, arranged to clamp against the upper face of vessel bottom 11. The grooves in the surfaces 35 and 38 of the two parts may be filled with sealing material such as a cement, as indicated at 39, to insure moisture-proof contact between adjoining parts. To firmly clamp the parts together, a clamp plate 41 is provided, preferably of dished or other somewhat springy form, centrally anchored, as by a screw 42 to a boss 43 on the bottom 16 of the heating cup, and with its edges lapping beyond the inner edges of base wall 35 to clamp the parts intervening between it and the cup. I prefer also that a sheet of heat insulating material, such as asbestos, shown at 44, be clamped against the underside of the surface 35 by the clamping plate 41, the asbestos sheet and the clamping plate being of course suitably apertured as shown at 46 and 46' for the passage of the wire ends from the heating coil.

Near its bottom the base wall is provided with a shoulder 47 to receive a cover plate 48 underlaid by an insulating and packing layer 49 of asbestos or the like, the cover plate being secured by screws 50, taking into suitable bosses cast on the base. The base thus provides a chamber sealed against ingress of moisture, adapted to contain a body of dead air between its insulating layers 44 and 49, so that the possibility of burning or overheating a table or other structure on which the utensil is placed, is minimized.

In operation, it will be apparent, the well 15 provides a relatively small compartment in which a body of liquid may rapidly be heated for expulsion through the percolator tube 23, and the concentration of heat with respect to such a small water body causes the percolating action to begin after very short intervals of operation, and accordingly the percolating action begins when the water body as a whole is at relatively a very low temperature, far below boiling point. The double-walled hood 22 heat-insulates the well, so that vapor generated therein is not condensed by the cooler fluid outside of the well. As steam accumulates it tends to drive the liquid out of the chamber, but on lowering the water level entire access to the lower end of the tube 23 is had, the steam belches liquid out of the top of tube 23 and a rush of water through inlet tube 27 refills the well to above the eduction-tube-end level. The action is prompt, rapid and efficient.

It will be understood however that while I have described my invention particularly in relation to a percolator, features of the heating construction and base structure may be applied to other forms of utensils, and, in any such embodiment, may provide a sanitary, easily cleansed structure, not liable to be damaged any way by immersion of the entire structure in water, in washing or the like, and one that is readily applicable to any form of vessel.

Having described my invention, what I claim is:

1. A combined base and heating unit for utensils comprising a hollow-walled cup, a heating unit therein, a base member, said cup and base member providing coacting surfaces to receive between them a portion of the utensil, and clamping means, comprising a circular plate screw connected to the cup at its center, its marginal portion bearing against the base member to force the coacting surfaces together.

2. The combination of a hollow-walled, upwardly-opening cup having an external clamping flange, an electrical heating element contained in the hollow wall of said cup, a base, having a clamping surface opposed to said flange, and a clamping member conected with said cup at the center thereof and acting on the under side of said surface of the base to force said base surface toward the opposing flange.

3. The combination, in a heating and base structure for utensils, of a heating coil, a structure containing said heating coil and having a flange to bear upon the bottom of the utensil, a base having a flange to bear against the other side of the utensil bottom, and spring means carried by the heater structure acting against the flange on the base and normally tensioned, yieldingly to force said flanges toward each other.

4. An electrically heated utensil comprising a vessel having a bottom opening, a metal cup having a double peripheral wall providing an upwardly opening central well and a downwardly opening channel, said channel opening to the exterior of the cup, a portion of said cup bearing on the bottom of the vessel around the opening, a base bearing against the bottom of said vessel around the opening, and a clamping plate bearing at its edges against the base and centrally mounted on the cup.

5. An electric heating structure for attachment to a utensil bottom comprising in combination a double wall cup providing an upwardly opening well and a downwardly opening channel having a border flange, an electrical heating element in said channel, a base structure having a top portion to underlie said flange, and a resilient clamp plate secured to said cup and having its edges arranged to underlie the top of the base to press the latter toward the flange of the cup.

6. In a percolator, a vessel having in its bottom an upwardly opening cup with a double peripheral wall containing in the annular space between its walls an electrical heating element, said cup having a tubular opening through its walls near the bottom thereof, and a hood making substantially close contact with the upper edge of the cup and communicating with the percolator tube.

7. In a percolator, a vessel having a bottom well that has an inlet opening from the vessel body near the well-bottom, an electrical heating element for applying heat to said well, a hood closing the top of the well, and a percolator tube having its lower end opening in the well between the hood and the inlet opening of the well.

8. In a percolator, a vessel having a bottom well structure housing, an electrical heating unit and having an inlet opening near its bottom, a double-walled, heat-insulating hood closing the top of said well, and a percolator tube extending into said well and opening thereto between the inlet and the hooded area.

In testimony whereof I hereunto set my hand in the presence of two subscribing witnesses.

DAVYDD C. G. HUGHES.

In the presence of—
STANLEY W. COOK,
MARY Y. ALLEN.